US007395582B2

(12) United States Patent
Bowers

(10) Patent No.: US 7,395,582 B2
(45) Date of Patent: Jul. 8, 2008

(54) ARTICLE RETENTION BAND

(75) Inventor: Lee N. Bowers, Springfield, OH (US)

(73) Assignee: Honda Motor Company, Ltd., Tokyo (JP)

( * ) Notice: Subject to any disclaimer, the term of this patent is extended or adjusted under 35 U.S.C. 154(b) by 0 days.

(21) Appl. No.: 11/484,964

(22) Filed: Jul. 12, 2006

(65) Prior Publication Data

US 2008/0010783 A1 Jan. 17, 2008

(51) Int. Cl.
*B65D 63/04* (2006.01)

(52) U.S. Cl. ........................ 24/20 W; 24/20 R; 24/273; 292/325

(58) Field of Classification Search ................. 24/20 R, 24/20 W, 272, 273; 292/325
See application file for complete search history.

(56) References Cited

U.S. PATENT DOCUMENTS 3,797,077 A * 3/1974 Omori et al. .................. 24/273
4,091,511 A * 5/1978 Reddy ......................... 24/273
4,701,982 A * 10/1987 Matsuno et al. ............... 24/273
4,914,788 A 4/1990 Ojima
4,987,651 A 1/1991 Oetiker
5,033,167 A 7/1991 Uchman
5,044,814 A * 9/1991 Hama ......................... 403/290
5,103,535 A 4/1992 Ishijima
5,183,351 A 2/1993 Schneider
6,185,793 B1 2/2001 Kitamura et al.
6,244,967 B1 6/2001 Takabe et al.
6,687,960 B2 2/2004 Kitamura et al.
2005/0051973 A1 3/2005 Wang
2005/0173872 A1 8/2005 Ogino

* cited by examiner

*Primary Examiner*—Robert J. Sandy
*Assistant Examiner*—Marcus Menezes
(74) *Attorney, Agent, or Firm*—Ulmer & Berne LLP

(57) ABSTRACT

An article retention band includes a ring, a lever, and a clasp. The ring has an inner circumference and is configured to encircle and apply a compressive force around an exterior circumference of an article. The lever is attached to the ring and has an end surface. The lever is moveable between a first position in which the end surface is spaced from the ring and a second position in which the end surface is adjacent to the ring. Movement of the lever from the first position to the second position results in a reduction of the inner circumference of the ring. A clasp is configured for selectively retaining the lever in the second position such that the clasp at least partially covers the end surface of the lever. A drive assembly and a vehicle having a drive assembly are also provided.

24 Claims, 4 Drawing Sheets

ARTICLE RETENTION BAND

TECHNICAL FIELD

The present invention relates to an article retention band for applying compressive force around an exterior circumference of an article. In one embodiment, the article retention band can comprise a boot band for a vehicle's drive shaft.

BACKGROUND OF THE INVENTION

Many vehicles, such as all terrain vehicles (ATVs), include drive shafts for transmitting rotational force from an engine or motor to one or more wheels. On ATVs having independent-type front or rear suspensions, drive shafts are arranged on opposite sides of the ATV, and usually mirror each other symmetrically about the center of the ATV. When such an ATV moves in one direction, the mirroring drive shafts rotate in opposite directions. It is common to provide rubber boots adjacent to one or both ends of each drive shaft to protect the end joints of the drive shaft from contamination and to contain grease.

Bands are typically employed for use in securing the rubber boots to the drive shaft. However, conventional bands are prone to snagging brush or other debris present beneath the ATV during travel of the ATV. This snagging can result in damage to the band, the boot, the drive shaft, and/or other components of the ATV. For example, FIGS. 8-12 depict a conventional band 130 which includes a ring 138, a lever 142 and a clasp 146. Portions of an inner surface 154 of the ring 138 adjacent to ends 148 and 150 of the ring 138 are attached together at an attachment location 152 such that an inner surface 154 of the ring 138 provides an inner circumference 140 for surrounding a boot. A first surface 158 of a lever 142 is attached to an outer surface 156 of the ring 138 adjacent to the end 148, and the lever 142 is movable from a first position (shown in FIG. 8) to a second position (shown in FIG. 9). Movement of the lever 142 from the first position to the second position results in a reduction of the inner circumference 140 of the ring 138 and resultant tightening of the band 130 around a boot. When in the second position, a second surface 160 of the lever 142 contacts the outer surface 156 of the ring 138.

A clasp 146 is attached to the inner surface 154 of the ring 138. Referring to FIG. 11, the clasp 146 includes a base 162 from which side walls 164, 166 extend. When the lever 142 is in the second position, the side walls 164, 166 of the clasp 146 are bent over the lever 142 to maintain the lever 142 in the second position, as shown in FIG. 10. Each of the side walls 164, 166 has respective top ends 168 and 170 which are substantially straight, and which are configured, when bent, to meet (or nearly meet) along a substantially straight line near the middle of the ring 138, as best shown in FIGS. 10-11. An end surface 144 of the lever 142 protrudes from the clasp 146 and is prone to catching on debris (e.g., brush), particularly when the band 130 rotates in a reverse direction $R_3$ as opposed to a forward direction $R_4$, as shown in FIG. 9.

SUMMARY OF THE INVENTION

In accordance with one embodiment of the present invention, an article retention band is provided which comprises a ring, a lever and a clasp. The ring has an inner circumference and is configured to encircle and apply a compressive force around an exterior circumference of an article. The lever is attached to the ring and has an end surface. The lever is moveable between a first position in which the end surface is spaced from the ring and a second position in which the end surface is adjacent to the ring. Movement of the lever from the first position to the second position results in a reduction of the inner circumference of the ring. The clasp is configured for selectively retaining the lever in the second position such that the clasp at least partially covers the end surface of the lever.

In accordance with another embodiment of the present invention, a drive assembly is provided which comprises a drive shaft, a boot, and a band. The drive shaft has an end and the boot surrounds a portion of the drive shaft adjacent to the end and has an exterior circumference. The band comprises a ring, a lever and a clasp. The ring has an inner circumference and is configured to encircle and apply a compressive force around the exterior circumference of the boot. The lever is attached to the ring and has an end surface. The lever is moveable between a first position in which the end surface is spaced from the ring and a second position in which the end surface is adjacent to the ring. Movement of the lever from the first position to the second position results in a reduction of the inner circumference of the ring and resultant tightening of the band around the boot. The clasp is configured for selectively retaining the lever in the second position such that the clasp at least partially covers the end surface of the lever.

In accordance with yet another embodiment of the present invention, a vehicle having a drive assembly is provided. The drive assembly comprises a drive shaft, a boot, and a band. The drive shaft has an end and the boot surrounds a portion of the drive shaft adjacent to the end and has an exterior circumference. The band comprises a ring, a lever and a clasp. The ring has an inner circumference and is configured to encircle and apply a compressive force around the exterior circumference of the boot. The lever is attached to the ring and has an end surface. The lever is moveable between a first position in which the end surface is spaced from the ring and a second position in which the end surface is adjacent to the ring. Movement of the lever from the first position to the second position results in a reduction of the inner circumference of the ring and resultant tightening of the band around the boot. The clasp is configured for selectively retaining the lever in the second position such that the clasp at least partially covers the end surface of the lever.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EMBODIMENTS

The present invention and its operation is hereinafter described in detail in connection with the views and examples of FIGS. 1-7 wherein like numbers indicate the same or corresponding elements throughout the views. An article retention band in accordance with the present invention can be provided for use in any of a variety of applications upon a vehicle such as, for example, an automobile, truck, van, motorcycle, recreational vehicle, watercraft, aircraft, agricultural equipment, construction equipment, or toy. However, an article retention band in accordance with the present invention can alternatively be used as a hose clamp, a packaging strap, a pole strap, or in any of a variety of other vehicular or non-vehicular applications.

Figure 1:
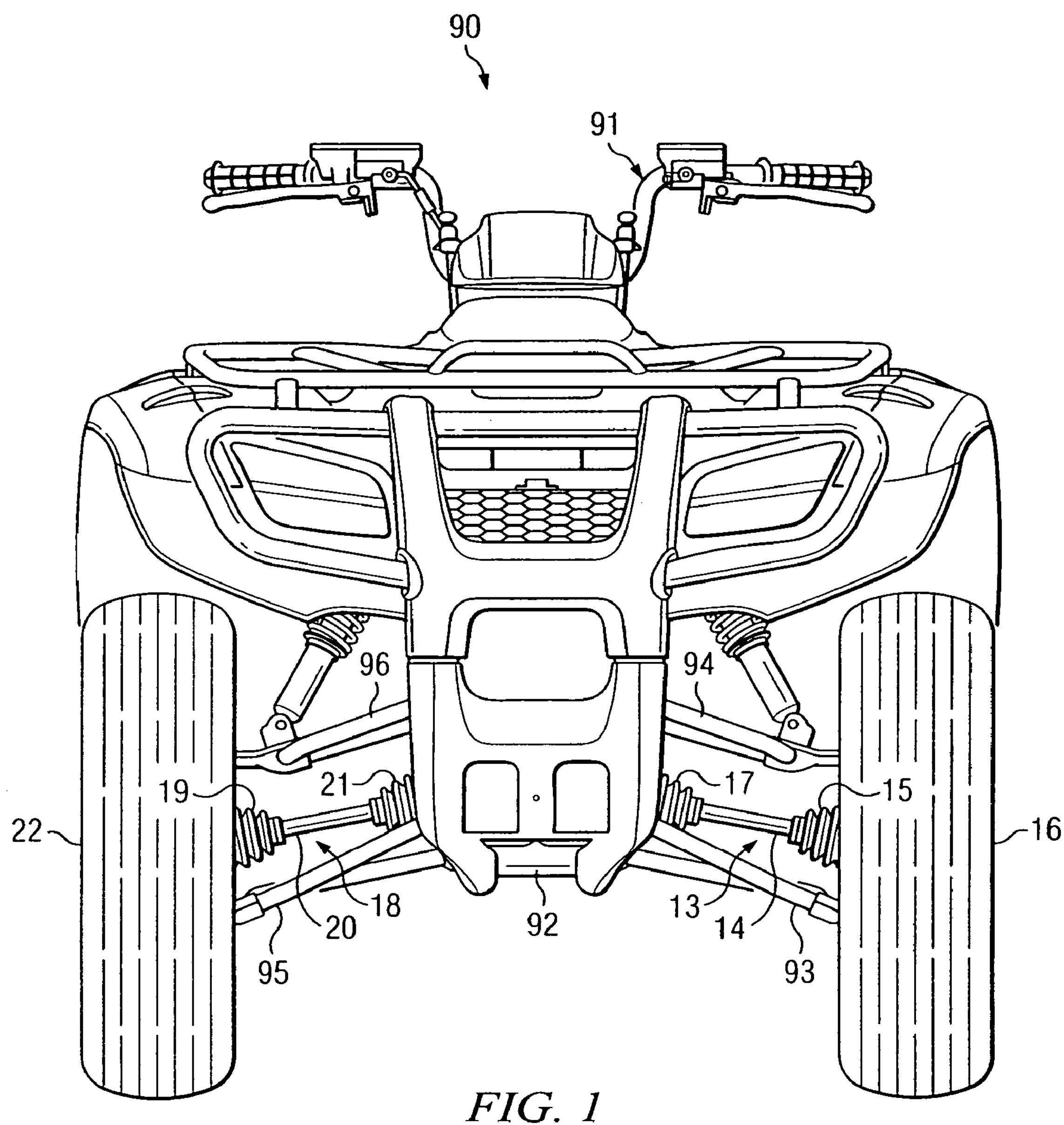
FIG. 1 is a front elevational view depicting an ATV having a drive assembly in accordance with one embodiment of the present invention.

In one particular embodiment of the present invention, an article retention band can comprise a boot band for use as part of a drive assembly for a vehicle such as an ATV. For example, as shown in FIG. 1, an ATV 90 includes a left wheel 16 and a right wheel 22 which are both capable of steering by an operator through use of handlebars 91. The left wheel 16 is shown to be supported with respect to a frame 92 of the ATV 90 by suspension arms 93 and 94. Likewise, the right wheel 22 is shown to be supported with respect to the frame 92 of the ATV 90 by suspension arms 95 and 96. It will be appreciated that one or more of the suspension arms can comprise A-arms, shock absorbers, struts, and/or springs for use in resiliently supporting a wheel (e.g., 16, 22) with respect to the frame 92, and that the wheels can be supported with respect to the frame of an ATV in any of a variety of configurations known to those skilled in the art.

The ATV 90 is shown to be provided with front wheel drive capability, and therefore includes a drive assembly 13 which provides power to the left wheel 16 and a drive assembly 18 which provides power to the right wheel 22. The drive assembly 13 is shown to include a drive shaft 14 and boots 15 and 17. Likewise, the drive assembly 18 is shown to include a drive shaft 20 and boots 19 and 21. The boots (e.g., 15, 17, 19 and 21) protect the end joints of the drive shafts from contamination and additionally can contain grease to effect continued lubrication of the end joints of the drive shafts. In one embodiment of the present invention, each of the drive assemblies 13 and 18 can be manufactured from identical components. However, in an alternative embodiment of the present invention, different drive assemblies of a particular vehicle can be manufactured through use of different components. The ATV 90 may also include a similar arrangement of drive assemblies for providing power to its rear wheels.

Figure 2:
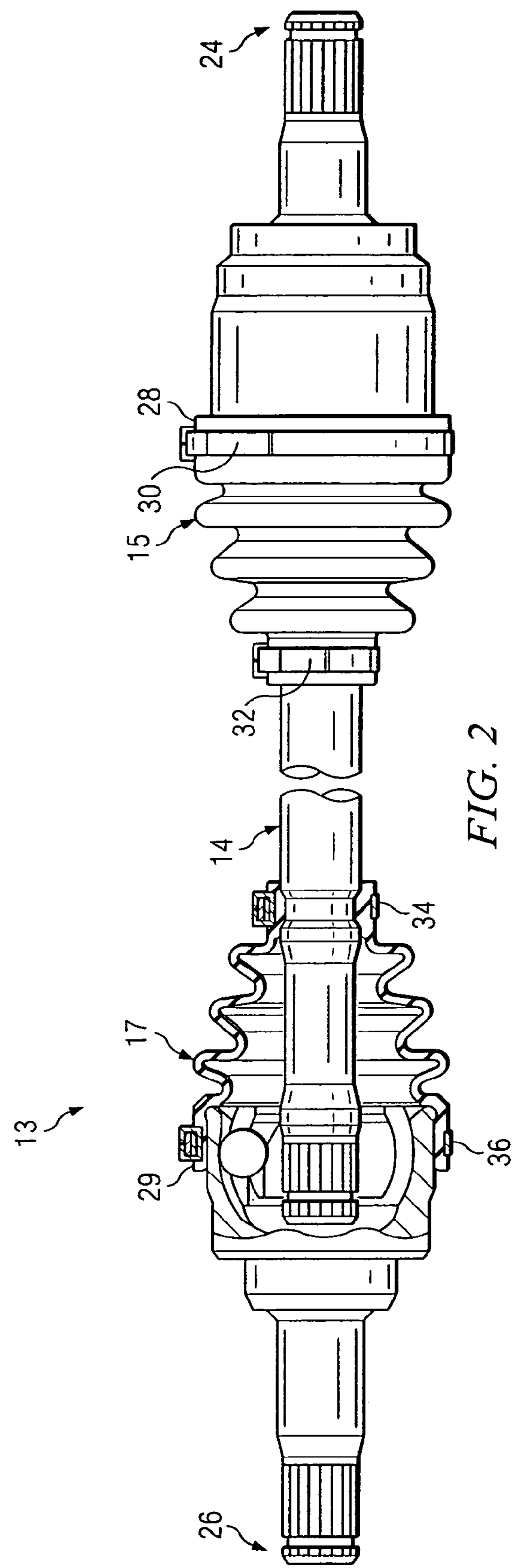
FIG. 2 is an elevational view depicting a drive assembly removed from the ATV of FIG. 1, wherein a portion of the drive assembly is broken away for clarity of illustration.

FIG. 2 depicts the drive assembly 13 removed from the ATV 90. The drive assembly 13 extends from a first end 24 to a second end 26. The boot 15 surrounds a portion of the drive shaft 14 adjacent to the first end 24, and the boot 17 surrounds a portion of the drive shaft 14 adjacent to the second end 26. The boot 15 is held onto the drive shaft 14 by retention bands (i.e., bands 30 and 32). Likewise, the boot 17 is held onto the drive shaft 14 with retention bands (i.e., 34 and 36). The bands 30 and 32 each encircle an exterior circumference (e.g., 28) of the boot 15, while the bands 34 and 36 each encircle an exterior circumference (e.g., 29) of the boot 17. In this manner, bands 30, 32, 34, and 36 serve as boot retention bands or boot bands for maintaining the boots 15 and 17 in secured positions with respect to the drive shaft 14. Without the bands 30, 32, 34, and 36, the boots 15 and 17 could become loose from the drive shaft 14, contamination could access the ends 24 and 26 of the drive shaft 14, and grease could escape from near the ends 24 and 26 of the drive shaft 14. If the ends of the drive shaft were to receive contamination and/or lose grease, the performance and longevity of the drive shaft would likely be substantially impaired. Accordingly, the bands can play an important role upon a vehicle by maintaining securement of boots in proper positions upon the vehicle's drive shafts.

Figure 3:
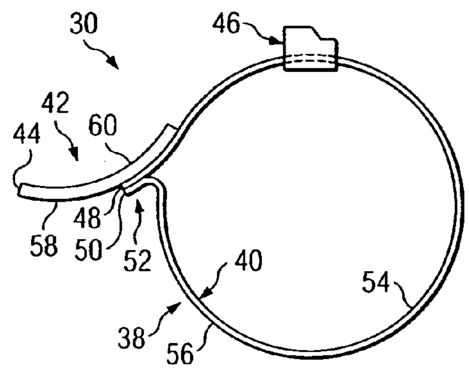
FIG. 3 is a side elevational view depicting a retention band removed from the drive assembly of FIG. 2, wherein a lever of the band is depicted in a first position.

Turning now to FIG. 3, the band 30 is depicted in further detail to include a ring 38, a lever 42, and a clasp 46. The lever 42 is attached to the ring 38 (e.g., with welding and/or adhesives) and has an end surface 44. The lever 42 is moveable between a first position (shown in FIG. 3) in which the end surface 44 is spaced from the ring 38 and a second position (shown in FIG. 4) in which the end surface 44 is adjacent to the ring 38. Movement of the lever 42 from the first position to the second position results in a reduction of the inner circumference 40 of the ring 38, thereby tightening the band 30 around an exterior circumference of an article such as a boot (e.g., 15). It will be appreciated that one or more of the bands 32, 34, and 36 can have a similar configuration to the band 30 described herein.

In one embodiment of the present invention, the ring 38 comprises a ribbon formed from metal such as stainless steel. However, it will be appreciated that the ring 38 could alternatively be formed from any of a variety of other materials. The ring 38 is shown to have respective ends 48 and 50, an inner surface 54, and an outer surface 56. Portions of the inner surface 54 adjacent to the ends 48 and 50 can be attached together in contact with each other at an attachment location 52. For example, as shown in FIG. 3, the attachment location 52 can extend from the ends 48 and 50 and along portions of the inner surface 54.

In one embodiment of the present invention, the lever 42 is formed from metal such as stainless steel. However, it will be appreciated that the lever 42 could alternatively be formed from any of a variety of other materials. The lever 42 can be attached (e.g., with welding and/or adhesives) to the outer surface 56 of the ring 38 adjacent to the attachment location 52 as shown, for example, in FIG. 3. More particularly, the lever 42 can have a first surface 58 and a second surface 60, and a portion of the first surface 58 is shown to be attached to the outer surface 56 of the ring 38 adjacent to the end 48. At least part of the second surface 60 of the lever 42 adjacent to the end surface 44 can contact the outer surface 56 of the ring 38 when the lever 42 is in the second position (shown in FIG. 4).

Figure 6:
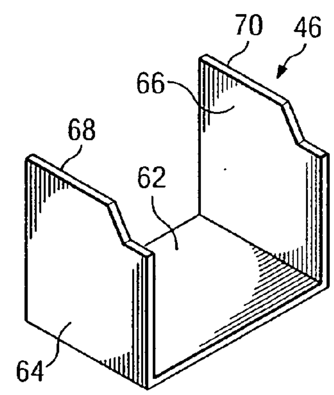
FIG. 6 is a perspective view depicting the clasp of FIGS. 3-5 apart from the remainder of the band.

The clasp 46 can be formed from metal such as stainless steel or can alternatively be formed from any of a variety of other materials. As shown in FIG. 6, the clasp 46 can be formed separately from the ring 38 and can comprise a base 62 and two side walls 64 and 66 which each extend from the base 62. In one particular embodiment, the base 62 of the clasp 46 is attached to the inner surface 54 of the ring 38, as shown in FIG. 3. For example, this attachment can be achieved through use of welding and/or adhesives. In an alternative embodiment of the present invention, however, the clasp can be formed integrally with the ring and/or the lever.

In one such embodiment, the side walls of the clasp can be provided integrally with, and extend from, the ring itself.

Figure 5:
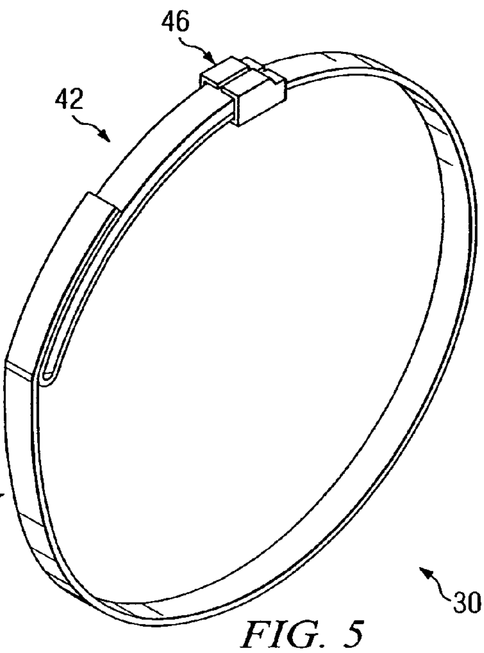
FIG. 5 is a perspective view depicting the band of FIG. 4.
Figure 4:
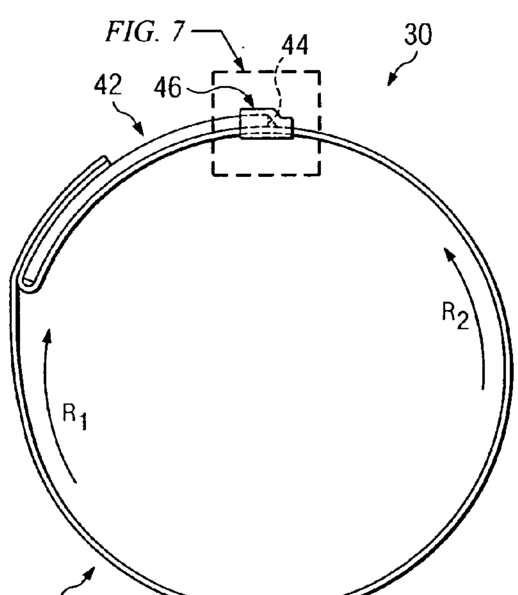
FIG. 4 is a side elevational view depicting the band of FIG. 3, wherein the lever is depicted in a second position and a clasp is bent over the lever.
Figure 7:
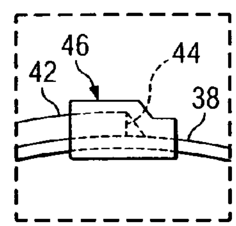
FIG. 7 is a side elevational view depicting a portion of the band of FIG. 4.
Figure 8:
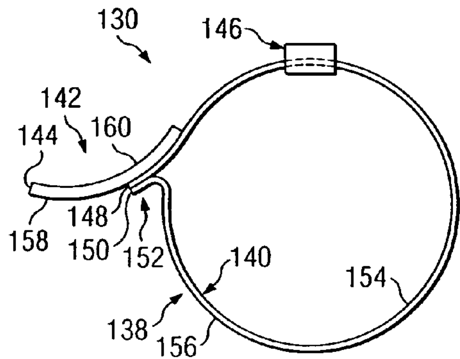
FIG. 8 is a side elevational view depicting a conventional retention band, wherein a lever of the band is depicted in a first position.
Figure 10:
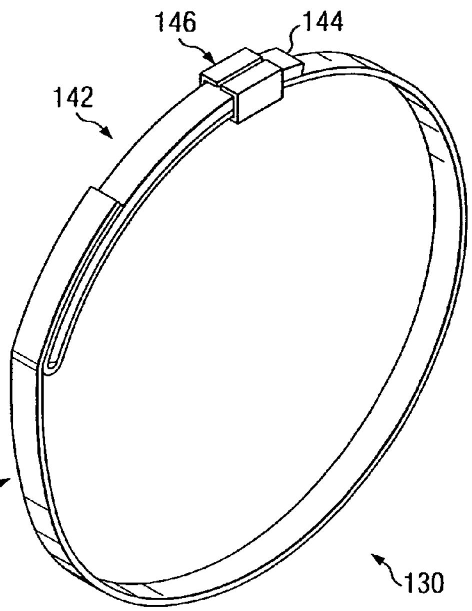
FIG. 10 is a perspective view depicting the band of FIG. 9.
Figure 9:
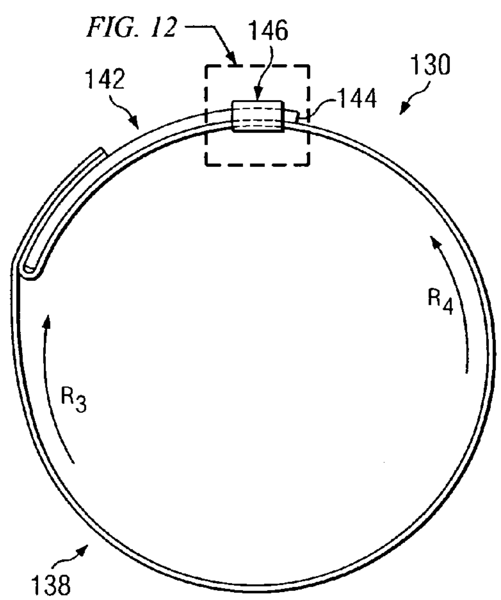
FIG. 9 is a side elevational view depicting the band of FIG. 8, wherein the lever is depicted in a second position and a clasp is bent over the lever.
Figure 11:
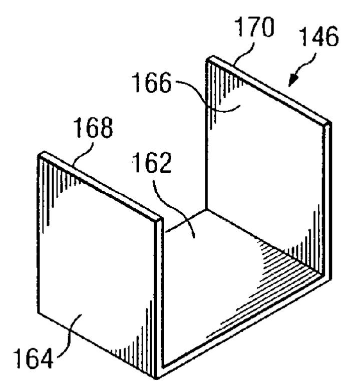
FIG. 11 is a perspective view depicting the clasp of FIGS. 8-10 apart from the remainder of the band.
Figure 12:
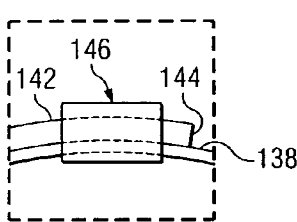
FIG. 12 is a side elevational view depicting a portion of the band of FIG. 9.

Referring to FIGS. 4-7, the clasp 46 can be configured such that the side walls 64 and 66 are selectively bendable over the end surface 44 of the lever 42 in order to retain the lever 42 in the second position. Each of the side walls 64, 66 of the clasp 46 extend from the base 62 to respective top ends 68, 70. These top ends 68, 70 are shown in FIG. 6 to have a stepped configuration so that, when the side walls 64 and 66 are bent over and onto the first surface 58 of the lever 42 (as shown in FIGS. 4, 5 and 7), the side walls 64 and 66 can meet substantially along a straight line near the center of the width of the ring 38, as best shown in FIG. 5. This meeting of the side walls may involve a space between the side walls (as shown by side walls 64 and 66 in FIG. 5), touching of the side walls, or even overlapping of the side walls.

However, a clasp in accordance with the teachings of the present invention can have any of a variety of alternative configurations provided, however, that the clasp at least partially covers the end surface (e.g., 44) of the lever when the clasp is retaining the lever in the second position. For example, one alternative clasp includes only a single wall which is bendable over a lever (e.g., by eliminating side wall 66 and lengthening side wall 64). As another example, a clasp can include more than two walls which are bendable over a lever. As yet another example, a clasp can be formed as a loop to completely encircle the end surface of the lever and a portion of the ring (e.g., by joining together the top ends 68 and 70). Any of a variety of processes and equipment can be used to crimp, smash, bend or otherwise secure the clasp in place with respect to the lever and the ring while the lever is in the second position. For example, in one particular configuration, a shoe can be used for bending the side walls 64, 66 of the clasp 46 over and onto the lever 42. The shoe can be shaped to bend the clasp from its initial shape (e.g., shown in FIG. 6) to its final shape (e.g., shown in FIGS. 4, 5 and 7) under force of a hydraulic press, a hand-operated crimping tool (ratcheting or non-ratcheting type), or other mechanism.

When the lever 42 is in the second position and the clasp 46 is then tightened over the lever 42, as shown in FIGS. 4, 5, and 7, the clasp 46 is positioned such that the end surface 44 of the lever 42 does not extend beyond the clasp 46. The clasp 46 accordingly at least partially covers the end surface 44 of the lever 42 so that the end surface 44 is unlikely to catch upon debris passing beneath the ATV 90, regardless of whether the band 30 is rotating in a reverse direction $R_1$ or a forward direction $R_2$, as shown in FIG. 4. In some embodiments, the clasp 46 can substantially completely cover the end surface 44 of the lever 42 while retaining the lever 42 in the second position, as shown in FIG. 7. In one particular embodiment, as also shown in FIG. 7, the lever 42 extends about halfway through the clasp 46. However, in other embodiments, the clasp might not substantially completely cover the end surface of the lever and/or the lever may extend greater or less than about halfway through the clasp.

By at least partially covering the end surface 44 of the lever 42, the clasp 46 helps to streamline the rotational profile of the band 30 such that the end of the lever 42 having the end surface 44 is less likely to snag on debris beneath the vehicle. This is particularly advantageous when the band 30 is rotating in a reverse direction $R_1$, as shown in FIG. 4. As previously indicated, snagging of the lever 42 can result in damage to the band 30, the boot, the drive shaft, and/or other components of a vehicle. Through use of a clasp in accordance with the teachings of the present invention, any likelihood that the boot retention band will snag upon debris beneath a vehicle can be significantly reduced as compared to conventional boot bands. In fact, this reduction can allow such a boot band to be installed upon a drive shaft without any consideration of the typical rotational direction of the drive shaft. As such, through use of a band in accordance with the teachings of the present invention, the process of manufacturing and inventorying drive assemblies for a vehicle can be simplified, and efficiencies can accordingly be achieved.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. An article retention band comprising:

a ring having an inner circumference, the ring configured to encircle and apply a compressive force around an exterior circumference of an article;

a lever attached to the ring at an attachment location and having an end surface, the lever being moveable between a first position in which the end surface is spaced from the ring and a second position in which the end surface is adjacent to the ring, wherein movement of the lever from the first position to the second position results in a reduction of the inner circumference of the ring; and a clasp comprising two side walls, each of the side walls comprising a respective top end which is stepped to define high and low sections of the side wall, the clasp being fixedly disposed relative to the attachment location such that, when the lever is in the second position and the ring encircles and applies a compressive force around an exterior circumference of an article, the end surface of the lever does not extend beyond the clasp and each side wall is selectively bendable such that portions of each said high section contact the lever and compress the lever against the ring in a radial direction and the end surface of the lever does not extend beyond the high section of each said side wall of the clasp.

2. The article retention band of claim 1 wherein, for each said side wall, the top end comprises a first portion corresponding with the high section of the side wall, a second portion corresponding with the low section of the side wall, and an intermediate portion disposed between the first portion and the second portion.

3. The article retention band of claim 2 wherein, for each said side wall, the intermediate portion of the top end is adjacent to each of the first portion of the top end and the second portion of the top end.

4. The article retention band of claim 3 wherein, for each said side wall, the intermediate portion of the top end is inclined with respect to each of the first portion of the top end and the second portion of the top end.

5. The article retention band of claim 4 wherein, for each said side wall, the first portion of the top end lies within a first plane, the second portion of the top end lies within a second plane, the first plane and the second plane are parallel with one another, and the intermediate portion resides entirely between the first plane and the second plane.

6. The article retention band of claim 5 wherein the ring comprises an inner surface and an outer surface, the lever comprises a first surface and a second surface, portions of the inner surface adjacent to respective ends of the ring are attached together in contact with each other adjacent to the attachment location, a portion of the first surface of the lever is attached to the outer surface of the ring at the attachment location, and the second surface of the lever contacts the outer surface of the ring along the entire length of the lever when the lever is in the second position.

7. The article retention band of claim 6 wherein the clasp is formed separately from the ring, the clasp comprises a base from which each of the side walls extends, and the base of the clasp is attached to the inner surface of the ring.

8. The article retention band of claim 1 wherein the top ends of the side walls are substantially evenly spaced from one another when the side walls are bent over the end surface of the lever.

9. An article retention band comprising:

a ring comprising an inner surface, an outer surface, and an inner circumference, portions of the inner surface adjacent to respective ends of the ring are attached together in contact with each other adjacent to an attachment location, and the ring is configured to encircle and apply a compressive force around an exterior circumference of an article;

a lever comprising a first surface, a second surface, and an end surface, a portion of the first surface of the lever is attached to the outer surface of the ring at the attachment location, the lever being moveable between a first position in which the end surface is spaced from the ring and a second position in which the second surface of the lever contacts the outer surface of the ring along the entire length of the lever, wherein movement of the lever from the first position to the second position results in a reduction of the inner circumference of the ring; and a clasp comprising a base and two side walls extending from the base, each of the side walls comprising a respective top end which is stepped to define high and low sections of the side wall, the clasp being attached to the ring such that, when the lever is in the second position and the ring encircles and applies a compressive force around an exterior circumference of an article, the end surface of the lever does not extend beyond the clasp and each side wall is selectively bendable such that portions of each said high section contact the lever and compress the lever against the ring and the end surface of the lever does not extend beyond the high section of each said side wall of the clasp.

10. The article retention band of claim 9 wherein, for each said side wall, the top end comprises a first portion corresponding with the high section of the side wall, a second portion corresponding with the low section of the side wall, and an intermediate portion disposed between the first portion and the second portion and inclined with respect to each of the first portion and the second portion.

11. The article retention band of claim 10 wherein, for each said side wall, the first portion of the top end lies within a first plane, the second portion of the top end lies within a second plane, the first plane and the second plane are parallel with one another, and the intermediate portion resides entirely between the first plane and the second plane.

12. The article retention band of claim 10 wherein the top ends of the side walls are substantially evenly spaced from one another when the side walls are bent over the end surface of the lever.

13. An article retention band comprising:

a ring having an inner circumference, the ring configured to encircle and apply a compressive force around an exterior circumference of an article;

a lever attached to the ring and having an end surface, the lever being moveable between a first position in which the end surface is spaced from the ring and a second position in which the end surface is adjacent to the ring, the lever being movable to selectively reduce the inner circumference of the ring; and a clasp comprising two side walls, each of the side walls comprising a respective top end which is stepped to define high and low sections of the side wall, and each of the side walls configured to be selectively bent such that portions of each said high section contact the lever and compress the lever against the ring in a radial direction and the end surface of the lever does not extend beyond the high section of each said side wall of the clasp.

14. The article retention band of claim 13 wherein, for each said side wall, the top end comprises a first portion corresponding with the high section of the side wall, a second portion corresponding with the low section of the side wall, and an intermediate portion disposed between the first portion and the second portion and inclined with respect to each of the first portion and the second portion.

15. The article retention band of claim 14 wherein, for each said side wall, the first portion of the top end lies within a first plane, the second portion of the top end lies within a second plane, the first plane and the second plane are parallel with one another, and the intermediate portion resides entirely between the first plane and the second plane.

16. The article retention band of claim 15 wherein the clasp is formed separately from the ring, the clasp comprises a base from which each of the side walls extends, and the base of the clasp is attached to the ring.

17. A drive assembly comprising:

a drive shaft having an end;

a boot surrounding a portion of the drive shaft adjacent to the end, the boot having an exterior circumference; and a band comprising a ring, a lever and a clasp, the ring having an inner circumference and configured to encircle and apply a compressive force around the exterior circumference of the boot, the lever attached to the ring and having an end surface, the lever being moveable between a first position in which the end surface is spaced from the ring and a second position in which the end surface is adjacent to the ring, the lever being moveable to selectively reduce the inner circumference of the ring, the clasp comprising two side walls, each of the side walls comprising a respective top end which is stepped to define high and low sections of the side wall, each of the side walls being configured to be selectively bent such that portions of each said high section contact the lever and compress the lever against the ring in a radial direction and the end surface of the lever does not extend beyond the high section of each said side wall of the clasp.

18. The drive assembly of claim 17 wherein, for each said side wall of the clasp, the top end comprises a first portion corresponding with the high section of the side wall, a second portion corresponding with the low section of the side wall, and an intermediate portion disposed between the first portion and the second portion and inclined with respect to each of the first portion and the second portion.

19. The drive assembly of claim 18 wherein, for each said side wall of the clasp, the first portion of the top end lies within a first plane, the second portion of the top end lies within a second plane, the first plane and the second plane are parallel with one another, and the intermediate portion resides entirely between the first plane and the second plane.

20. The drive assembly of claim 19 wherein the clasp is formed separately from the ring, the clasp comprises a base from which each of the side walls extends, and the base of the clasp is attached to the ring.

21. A vehicle having a drive assembly, wherein the drive assembly comprises:

a drive shaft having an end;

a boot surrounding a portion of the drive shaft adjacent to the end, the boot having an exterior circumference; and a band comprising a ring, a lever and a clasp, the ring having an inner circumference and configured to encircle and apply a compressive force around the exterior circumference of the boot, the lever attached to the ring and having an end surface, the lever being moveable between a first position in which the end surface is spaced from the ring and a second position in which the end surface is adjacent to the ring, the lever being moveable to selectively reduce the inner circumference of the ring, the clasp comprising two side walls, each of the side walls comprising a respective top end which is stepped to define high and low sections of the side wall, each of the side walls being configured to be selectively bent such that portions of each said high section contact the lever and compress the lever against the ring in a radial direction and the end surface of the lever does not extend beyond the high section of each said side wall of the clasp.

22. The vehicle of claim 21 wherein, for each said side wall of the clasp, the first portion of the top end lies within a first plane, the second portion of the top end lies within a second plane, the first plane and the second plane are parallel with one another, and the intermediate portion resides entirely between the first plane and the second plane.

23. The vehicle of claim 22 wherein the clasp is formed separately from the ring, the clasp comprises a base from which each of the side walls extends, and the base of the clasp is attached to the ring.

24. The vehicle of claim 23 comprising an all terrain vehicle.

* * * * *